United States Patent [19]
Chisholm

[11] Patent Number: 5,713,188
[45] Date of Patent: Feb. 3, 1998

[54] HORSE HELMET

[76] Inventor: Carole J. Chisholm, 511 W. X St., Tumwater, Wash. 98501

[21] Appl. No.: 770,160
[22] Filed: Dec. 19, 1996

Related U.S. Application Data

[60] Provisional application No. 60/013,039, Mar. 8, 1996.
[51] Int. Cl.⁶ .................................................. B68C 5/00
[52] U.S. Cl. .................................................. 54/80.1
[58] Field of Search ............................ 54/79.1, 80.1, 54/80.2; 119/850

[56] References Cited

U.S. PATENT DOCUMENTS

| | | |
|---|---|---|
| 58,081 | 9/1866 | Elveena . |
| 87,938 | 3/1869 | Humphrey . |
| 127,820 | 6/1872 | Wilson . |
| D. 245,115 | 7/1977 | Centers et al. ............... D30/37 |
| 342,186 | 5/1886 | Corley ........................... 54/80.1 |
| 669,909 | 3/1901 | Young ........................... 54/80.1 |
| 4,040,239 | 8/1977 | Powell . |
| 5,321,937 | 6/1994 | Hamilton ..................... 54/80.2 |
| 5,456,215 | 10/1995 | Deutscher et al. ........... 119/850 |

FOREIGN PATENT DOCUMENTS

| | | |
|---|---|---|
| 2028057 | 4/1992 | Canada . |
| 322289 | 6/1902 | France .......................... 54/80.1 |
| 1687167 | 10/1991 | Russian Federation ...... 119/850 |

*Primary Examiner*—Robert P. Swiatek
*Attorney, Agent, or Firm*—Richard C. Litman

[57] ABSTRACT

A horse helmet for protecting the head of a horse from blunt force trauma experienced when the horse rears or jerks its head upwards and strikes overhanging framework. When horses are transported via trailers they sometimes rear or jerk their heads upwards and become injured or die when their heads strike the framework of the trailer. The horse helmet has a backing material made of felted fibers to provide comfort for the horse and an outer covering made of vinyl, leather or cloth to increase the durability of the helmet. Between the backing material and outer covering is a rubber pad which protects the horse from experiencing blunt force trauma during collisions with the trailer. Elastic straps with either snaps or hook and loop type fasteners allow the horse helmet to be easily and quickly attached to the rings of the horse's harness which allows the user to retain security of the horse.

12 Claims, 3 Drawing Sheets

HORSE HELMET

CROSS-REFERENCE TO RELATED APPLICATIONS

This application claims the benefit of U.S. Provisional Application No. 60/013,039, filed Mar. 8, 1996.

BACKGROUND OF THE INVENTION

1. Field of the Invention

The present invention relates generally to helmets and, more specifically, a helmet designed to protect the head of a horse, especially during transportation of the horse via a conventional horse trailer.

2. Description of the Prior Art

When the owner of a horse wishes to transport the horse to a different location, the conventional mode of transportation is via a horse trailer. For the owners, horse trailers are convenient and effective. For the horse, however, the trailers can be dangerous and even life threatening. Many horses are injured and die due to head injuries experienced when the horses rear or jerk their heads upwards or backwards and strike the framework of the trailer. The force of the head colliding with the unforgiving framework causes great injury to the horse. There is, therefore, a need for a protective horse helmet that will be easily secured to and removed from the head of the horse, provide a padded insert that will act as a protective cushion at the poll and between the ear holes in the event the horse's head hits the framework, provide attachment means including adjustable buckles and hook and loop type fasteners, and provide large ear holes for comfort and a universal fit. The present invention provides such an apparatus.

Horse helmets have been described in the patent literature. For example, U.S. Pat. No. 5,321,937 issued to Hamilton on Jun. 21, 1994, U.S. Pat. No. 87,938 issued to Humphrey on Mar. 16, 1869, U.S. Pat. No. 669,909 issued to Young on Mar. 12, 1901, Des. 245,115 issued to Centers, deceased et al. on Jul. 19, 1977, French Pat. No. 322,289 issued Jan. 1903, and Canadian Pat. No. 2,028,057 issued Apr. 1992, all describe horse or animal helmets having a strap running under the head of the horse but fail to disclose a horse helmet that is easily removable and attachable to the horse's halter in combination with a felted fiber underside for protection and comfort of the horse.

U.S. Pat. No. 58,081 issued to Elveena on Sep. 18, 1866 and 127,820 issued to Wilson on Jun. 11, 1872 both describe a helmet for a horse, the helmet having a protective pad, but these patents do not disclose elastic straps having snaps to quickly and easily attach the helmet to the harness or two separate material coverings for the helmet wherein the underside of the helmet is a felted fiber material for protection and comfort and the topside material is either vinyl, leather or cloth for durability and variety of colors.

U.S. Pat. No. 4,040,239 issued to Powell on Aug. 9, 1977 and 342,186 issued to Corley on May 18, 1886 both describe horse helmets but fail to disclose horse helmets having dual material coverings and elastic straps providing easy attachment of the horse helmet to the horse's halter.

None of the above inventions and patents, taken either singly or in combination, is seen to describe the instant invention as claimed.

SUMMARY OF THE INVENTION

The invention relates to a horse helmet for protecting the head of a horse from blunt force trauma experienced when the horse rears or jerks its head upwards and strikes overhanging framework. When horses are transported via trailers they sometimes rear or jerk their heads upwards and become injured or die when their heads strike the framework of the trailer. The horse helmet has a backing material made of felted fibers to provide comfort for the horse and an outer covering made of vinyl, leather or cloth to increase the durability of the helmet. Between the backing material and outer covering is a rubber pad which protects the horse from experiencing blunt force trauma during collisions with the trailer. Elastic straps with either snaps or hook and loop type fasteners allow the horse helmet to be easily and quickly attached to the rings of the horse's harness which allows the user to retain security of the horse.

Accordingly, it is a principal object of the invention to provide a horse helmet for protection of the horse's head.

It is another object of the invention to provide a horse helmet that easily attaches to the horse's head.

It is a further object of the invention to provide a horse helmet that elastically attaches to the horse's halter.

It is again an object of the invention to provide a horse helmet that has elastic straps and fasteners that secure the horse helmet to the horse's halter.

Still another object of the invention is to provide a horse helmet with an underside having material with qualities suitable for protection and comfort of the horse.

It is an additional object of the invention to provide a horse helmet with a topside having material comprising either vinyl, leather or cloth for durability and variety of colors.

It is also an object of the invention to provide a horse helmet having large ear holes for comfort to the horse and a universal fit.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
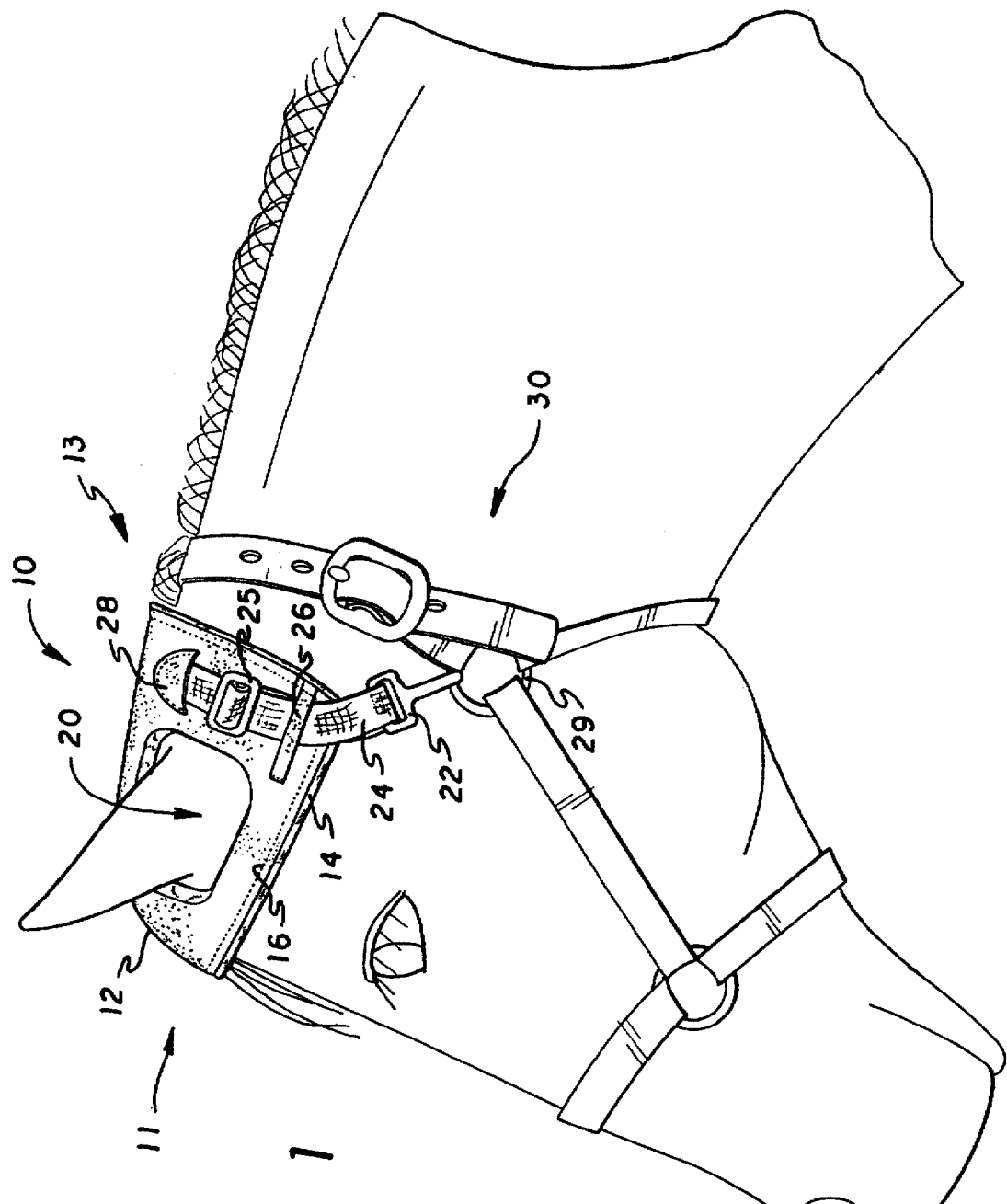
FIG. 1 is an environmental elevational view of the preferred embodiment showing an adjustable strap attachment.

Turning now to FIG. 1 of the drawings, the component parts of horse helmet 10 are shown, having an outer cover 12, backing material 14 sewn together at 16, front 11, rear 13, left part 15, and right part 17. Left part 15 is defined as the area of horse helmet 10 located to the left of upper middle seam 19 whereas right part 17 is defined as the area to the right of upper middle seam 19. Horse helmet 10 has a contoured shape corresponding to that of a horse's brow or poll. Outer cover 12 can be either vinyl, leather or cloth or similar material that provides durability and a variety of colors to horse helmet 10. Backing material 14 is comprised of felted fibers to aid in protection and comfort of the horse. A contrastingly colored piping may be provided for further ornamental appearance of the horse helmet 10. Ear hole 20 is of sufficient size to add comfort to the horse while simultaneously rendering a universal fit for most horses.

The structural characteristics of horse helmet 10 allow it to be attached in a quick and efficient manner to horse halter 30. Moreover, it allows the user to place horse helmet 10 on the horse without losing control of the horse while securing the helmet. The strap 24 is elastic and snap 22 is of conventional self-locking type, which together can be manipulated to be quickly and easily attached to or removed from ring 29 of horse halter 30. Elastic strap 24 is secured to horse helmet 10 by reinforcement 28 and stabilized by keeper 26. Keeper 26 and reinforcement 28 are both sewn to horse helmet 10.

Horse helmet 10 is also adjustable to fit horses having different sized heads, by means of adjustment bracket 25. To place horse helmet 10 securely and properly upon the horse, the user first places the horse's ears through ear holes 20. Next, the user adjusts strap 24 by use of adjustment bracket 25 such that horse helmet 10 fits properly on the horse. Once a good fit has been established, the user secures snap 22 to ring 29.

Figure 2:
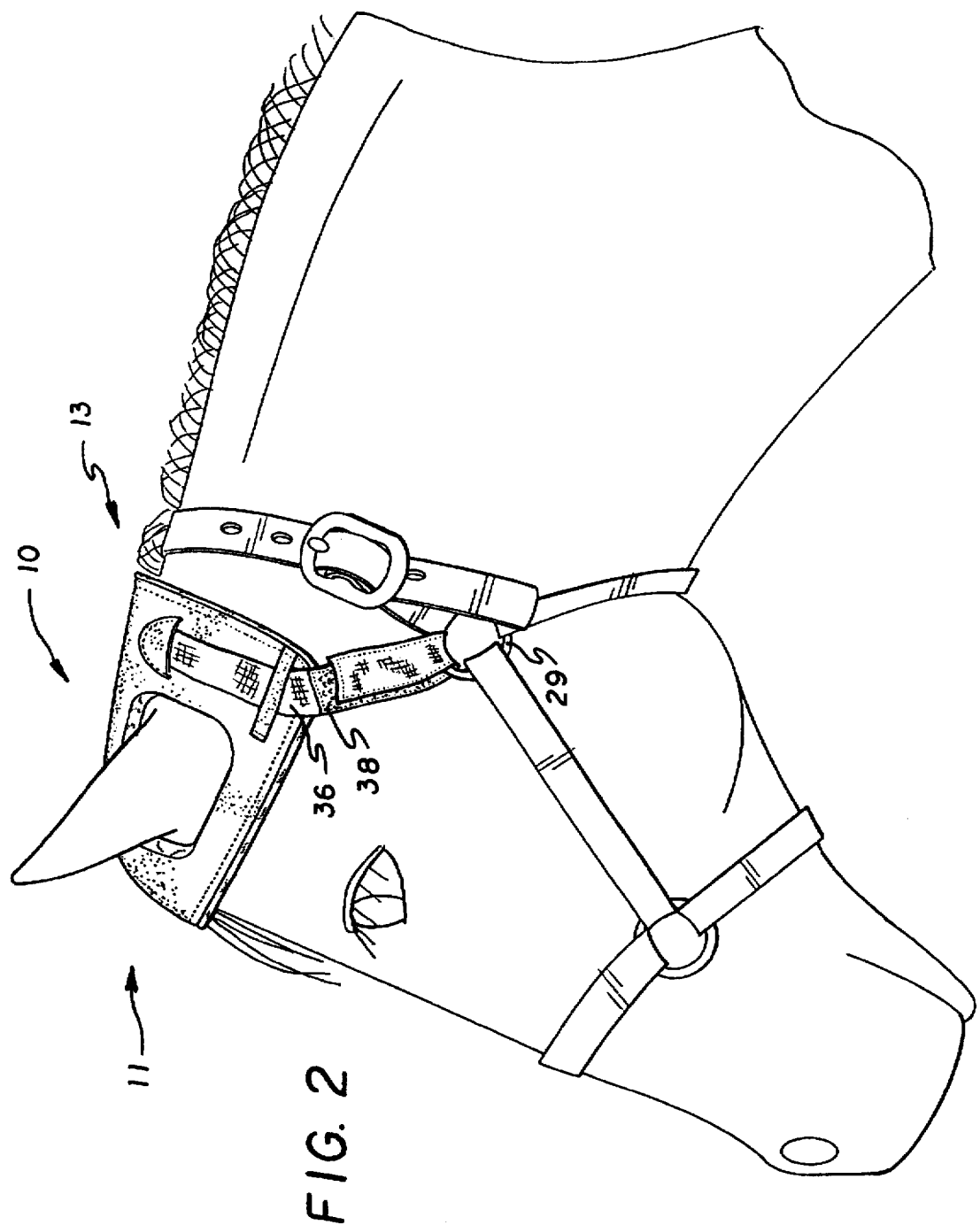
FIG. 2 is an environmental elevational view of a second embodiment showing an adjustable strap attachment.

An alternative method useful in securing horse helmet 10 is illustrated in FIG. 2. Hook and loop type fasteners 38, secured at the end of strap 36, replace the snap 22 and adjustment buckle 25 of FIG. 1. To securely and properly adjust horse helmet 10 to the horse, the user pulls down upon strap 36, places it through ring 29, then folds strap 36 back upon itself such that hook and loop type fasteners 38 connect.

Figure 3:
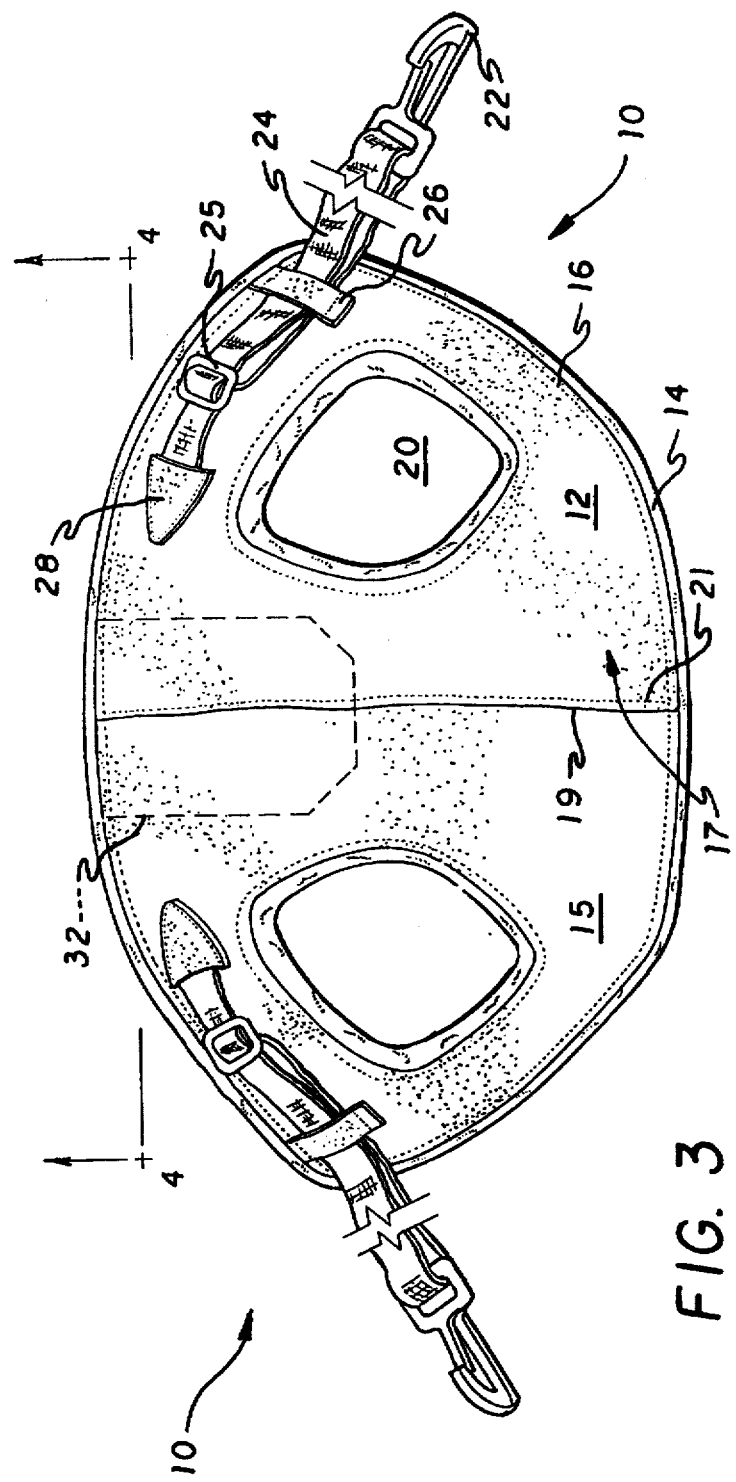
FIG. 3 is a frontal view, partially fragmented, of the preferred embodiment.
Figure 4:
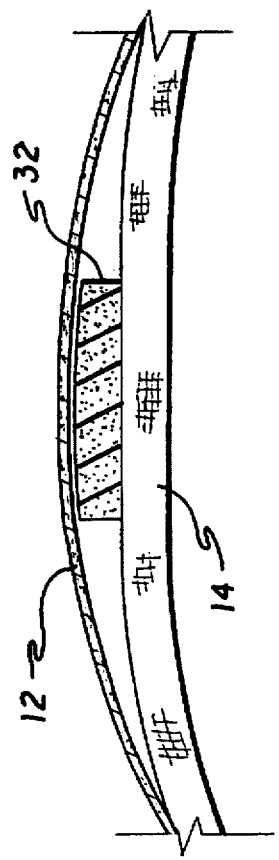
FIG. 4 is a sectional view of the preferred embodiment drawn along line 4—4 of FIG. 3.

FIGS. 3 and 4 of the drawings show horse helmet 10 wherein outer cover 12 is shown having a dual construction and sewn together at upper middle seam 19. Backing material 14, also two pieces, is sewn together at lower middle seam 21. The outer cover 12 and backing material 14 are sewn together around the perimeter of horse helmet 10 with rubber insert 32 in place, the rubber insert 32 as shown positioned between the outer cover 12 and backing material 14 in FIG. 4 and as generally indicated by phantom lines in FIG. 3. Preferably, rubber insert 32 is a closed cell foam rubber, such as neoprene. Rubber insert 32 is placed so that when the horse helmet is properly worn by the horse, the rubber insert 32 is located over the poll of the horse and between the ears. The rubber insert 32 protects the horse from injury due to blunt force trauma, particularly when experienced from contact with the frame of the trailer.

The fabric used to protect the horse from injury may be comprised of either or both man-made and natural materials; for example, leather for the outer cover 12 and durable man-made materials for the backing material 14 may be used. The use of man made or natural materials can be used either exclusively or in combination.

It is to be understood that the present invention is not limited to the sole embodiment described above, but encompasses any and all embodiments within the scope of the following claims.

I claim:

1. A horse helmet for use with a horse's halter comprising:
    an outer cover made of a durable material, wherein said outer cover is comprised of a left part and a right part joined together at an upper middle seam;
    a backing material comprised of felted fibers and attached to said outer cover, said backing material comprising two pieces attached to form a unitary construction at a lower middle seam;
    a plurality of ear holes dimensioned and configured to receive the ears of a horse, wherein one of said plurality of ear holes passes through said left part and its associated backing material and a second one of said plurality of ear holes passes through said right part and its associated backing material;
    a rubber pad disposed between said backing material and said outer cover, wherein said rubber pad is also positioned between said plurality of ear holes; and
    a plurality of elastic straps having means to attach said plurality of elastic straps to the horse's halter.

2. The horse helmet according to claim 1 wherein said horse helmet is contoured to cover a horse's poll.

3. The horse helmet according to claim 2 wherein said outer cover further has a front and a rear, said plurality of elastic straps attached to said outer cover at said rear.

4. The horse helmet according to claim 3 wherein said means to attach said plurality of elastic straps to the horse's halter comprise a snap dimensioned and configured to attach to the ring of the horse's halter.

5. The horse helmet according to claim 4 wherein said plurality of elastic straps each include an adjustment buckle for adjusting said straps in length permitting said horse helmet to fit variously sized horse heads.

6. The horse helmet according to claim 5 further comprising a plurality of keepers attached to said outer cover, each of said plurality of keepers for stabilizing each of said plurality of elastic straps by closely passing over each elastic strap, further comprising a plurality of reinforcements securing each said plurality of elastic straps to said horse helmet.

7. The horse helmet according to claim 2 wherein said outer cover further comprises a front and a rear and each said plurality of elastic straps are attached to said rear of said horse helmet.

8. The horse helmet according to claim 7 further comprising a plurality of keepers attached to said outer cover, each of said plurality of keepers for stabilizing each of said plurality of elastic straps by closely passing over each elastic strap, further comprising a plurality of reinforcements securing each said plurality of elastic straps to said horse helmet.

9. The horse helmet according to claim 8 wherein said means to attach said plurality of elastic straps to the horse's halter comprise hook and loop type fasteners positioned on each of said plurality of elastic straps for adjusting said horse helmet to fit various sized horse heads.

10. A horse helmet for use with a horse's halter comprising:
    an outer cover made of a durable material, wherein said outer cover is comprised of a left part and a right part, a front and a rear;
    a backing material comprised of felted fibers and attached to said outer cover, thereby forming a two-ply cover further being contoured to cover a horse's poll;
    a plurality of ear holes dimensioned and configured to receive the ears of a horse, wherein one of said plurality of ear holes passes through said left part and its associated backing material and a second one of said plurality of ear holes passes through said right part and its associated backing material;
    a rubber pad disposed between said backing material and said outer cover of said two-ply cover, wherein said rubber pad is also positioned between said plurality of ear holes;
    a plurality of elastic straps having means to attach said plurality of elastic straps to the horse's halter;

a plurality of reinforcements for securing said plurality of elastic straps to said outer cover; and, a plurality of keepers for stabilizing said plurality of elastic straps, each of said plurality of keepers closely passing over each elastic strap.

11. The horse helmet according to claim 10 wherein said means to attach said plurality of elastic straps to the horse's halter comprise a snap wherein said snap is dimensioned and configured to attach to the ring of the horse's halter and wherein said plurality of elastic straps are comprised of an adjustment buckle wherein said adjustment buckle is useful in adjusting said horse helmet to fit various sized horse heads.

12. The horse helmet according to claim 10 wherein said means to attach said plurality of elastic straps to the horse's halter comprise hook and loop type fasteners for adjusting the length of each of said plurality of elastic straps permitting said horse helmet to fit variously sized horse heads.

* * * * *